(12) United States Patent  (10) Patent No.: US 12,013,688 B2
You et al.  (45) Date of Patent: Jun. 18, 2024

(54) METHOD AND SYSTEM FOR LOT-TOOL ASSIGNMENT

(71) Applicant: TAIWAN SEMICONDUCTOR MANUFACTURING CO., LTD., Hsinchu (TW)

(72) Inventors: Ren-Chyi You, Yilan County (TW); An-Wei Peng, Hsinchu (TW); Chang-Zong Liu, Hsinchu (TW); Jun-Sheng Yeh, New Taipei (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 35 days.

(21) Appl. No.: 17/113,056

(22) Filed: Dec. 6, 2020

(65) Prior Publication Data

US 2021/0089012 A1    Mar. 25, 2021

Related U.S. Application Data

(63) Continuation of application No. 16/222,678, filed on Dec. 17, 2018, now Pat. No. 10,860,008, which is a continuation of application No. 14/871,896, filed on Sep. 30, 2015, now Pat. No. 10,162,340.

(51) Int. Cl.
  *G05B 19/418*   (2006.01)
(52) U.S. Cl.
  CPC ............... *G05B 19/41865* (2013.01); *G05B 2219/32266* (2013.01); *G05B 2219/32271* (2013.01); *G05B 2219/45031* (2013.01); *Y02P 90/02* (2015.11)

(58) Field of Classification Search
  None
  See application file for complete search history.

(56) References Cited

U.S. PATENT DOCUMENTS

| | | | |
|---|---|---|---|
| 5,826,238 A | 10/1998 | Chen | |
| 6,594,536 B1 * | 7/2003 | Lin | G05B 19/41865 700/121 |
| 6,604,012 B1 * | 8/2003 | Cho | G05B 19/41875 700/109 |
| 6,684,121 B1 | 1/2004 | Lu | |
| 6,687,563 B1 * | 2/2004 | Wang | G05B 19/41865 700/121 |
| 6,790,686 B1 * | 9/2004 | Purdy | G05B 19/41865 438/9 |
| 6,931,296 B2 | 8/2005 | Lin | |
| 7,236,843 B1 | 6/2007 | Wizelman | |

(Continued)

FOREIGN PATENT DOCUMENTS

WO   WO-9748043 A1 * 12/1997   ............... G06F 9/44

*Primary Examiner* — Jennifer L Norton
(74) *Attorney, Agent, or Firm* — Maschoff Brennan

(57) ABSTRACT

A system includes a dispatching system and at least one processor. The dispatching system is configured to provide dispatching preferences indicating that tools feedback preferences thereof for at least one lot. The processor is coupled to the dispatching system and at least one memory. Computer program code encoded in the memory is executed by the processor to cause the system to process the lot using at least one of the tools with utilization of a tool-lot relationship that is generated based on the dispatching preferences. A non-transitory computer readable medium and a method are also disclosed herein.

20 Claims, 3 Drawing Sheets

(56) References Cited

U.S. PATENT DOCUMENTS

| | | |
|---|---|---|
| 7,292,903 B2 | 11/2007 | Tseng |
| 7,653,451 B2 | 1/2010 | Denton |
| 7,668,614 B2 | 2/2010 | Govind |
| 7,720,559 B1 * | 5/2010 | Stewart ............... G05B 19/4187 |
| | | 700/121 |
| 7,720,560 B2 | 5/2010 | Menser, Jr. |
| 10,268,186 B2 | 4/2019 | Yon |
| 10,496,081 B2 | 12/2019 | Norman |
| 2002/0032495 A1 * | 3/2002 | Ozaki ..................... G05B 17/02 |
| | | 700/29 |
| 2002/0107599 A1 * | 8/2002 | Patel ............... G06Q 10/06393 |
| | | 700/32 |
| 2003/0171972 A1 * | 9/2003 | Heskin ............... G06Q 10/0631 |
| | | 705/7.12 |
| 2005/0075748 A1 | 4/2005 | Gartland et al. |
| 2005/0096770 A1 | 5/2005 | Chua et al. |
| 2005/0096782 A1 | 5/2005 | Chen et al. |
| 2005/0113955 A1 * | 5/2005 | Chien ..................... G06Q 10/06 |
| | | 700/99 |
| 2005/0203655 A1 * | 9/2005 | Tsai ................. G05B 19/41865 |
| | | 700/101 |
| 2005/0228527 A1 * | 10/2005 | Lee ........................ G06Q 10/08 |
| | | 700/115 |
| 2007/0179652 A1 | 8/2007 | Weigang et al. |
| 2008/0021585 A1 | 1/2008 | Cheng et al. |
| 2008/0195241 A1 | 8/2008 | Lin et al. |
| 2009/0062954 A1 * | 3/2009 | Lee ...................... G05B 19/418 |
| | | 700/121 |
| 2009/0299510 A1 | 12/2009 | Burda et al. |
| 2009/0317924 A1 * | 12/2009 | Ouyang ............ H01L 21/67276 |
| | | 707/999.107 |
| 2009/0326704 A1 | 12/2009 | Chan et al. |
| 2011/0172799 A1 | 7/2011 | Erickson et al. |
| 2013/0190915 A1 | 7/2013 | Choo et al. |
| 2016/0126120 A1 * | 5/2016 | Oza .................. H01L 21/67733 |
| | | 700/121 |
| 2017/0075333 A1 | 3/2017 | Norman |
| 2017/0083010 A1 | 3/2017 | Wu et al. |
| 2018/0216842 A1 | 8/2018 | Turney et al. |
| 2019/0250594 A1 | 8/2019 | You |
| 2020/0333771 A1 * | 10/2020 | You ..................... G05B 19/4187 |
| 2023/0107813 A1 * | 4/2023 | Norman ............. G05B 13/0265 |
| | | 700/28 |

\* cited by examiner

METHOD AND SYSTEM FOR LOT-TOOL ASSIGNMENT

CROSS-REFERENCE TO RELATED APPLICATION

The present application is a continuation of U.S. application Ser. No. 16/222,678, filed Dec. 17, 2018, issued as U.S. Pat. No. 10,860,008 on Dec. 8, 2020, which is a continuation of U.S. application Ser. No. 14/871,896, filed Sep. 30, 2015, issued as U.S. Pat. No. 10,162,340 on Dec. 25, 2018, all of which are herein incorporated by reference.

BACKGROUND

In a semiconductor fabrication process, integrated circuit (IC) devices are formed in sequential layers of material in a bottom-up manufacturing method. The manufacturing process utilizes a wide variety of processing and measuring tools and techniques to form the various layered features including various deposition techniques and thermal growth techniques. The processing tool performs the various processing functions as defined by a recipe for the manufacture of the semiconductor device.

In a wafer fabrication facility (fab), a lot transfer is controlled by automation systems. The methodology to feed work-in-progress (WIP) to tool is by an agent that is periodically and not timely triggered.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
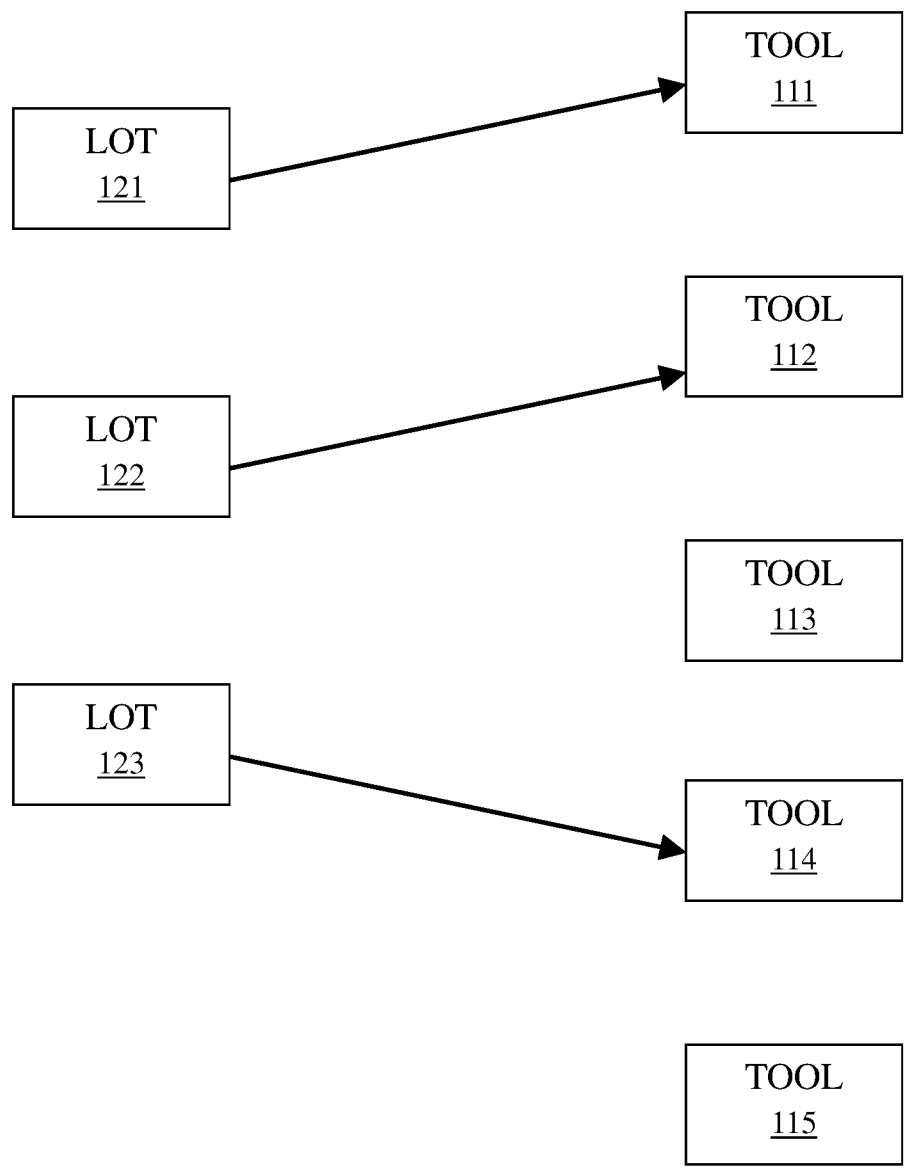
FIG. 1 is a block diagram of tools and lots in accordance with some embodiments of the present disclosure, in which the tool indicates a single chamber or multiple chambers.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Referring to FIG. 1, illustrated is tools 111-115 (e.g., semiconductor-manufacturing equipment) and lots 121-123 in accordance with some embodiments of the present disclosure. It should be noted that FIG. 1 illustrates three lots and five tools. However, the number discussed above is given for illustrative purposes. Various numbers of lots and tools are within the contemplated scope of the present disclosure. A semiconductor integrated circuit (IC) company, such as a semiconductor wafer foundry, provides various IC manufacturing services to customers, through a plurality of manufacturing sites (e.g., fabs). When an object such as lots 121-123 (a batch of wafer in process) is transferred from one manufacturing site to another, cross-facility operations require various processing steps. The tools 111-115 are configured to perform a semiconductor process on the lots 121-123 for semiconductor fabrication.

In some embodiments, semiconductor fabrication involves performing a relatively large number or process steps on a wafer in order to produce a desired semiconductor integrated circuit (IC). The fabrication process is a multiple-step sequence of photolithographic and chemical-processing steps during which electronic circuits are gradually created on a wafer composed of a semiconductor material.

The various processing steps fall into a number of categories including deposition, removal, patterning, and modification of electrical properties (i.e., doping). Deposition is a process that grows, coats, or otherwise transfers a material onto the wafer. Some examples of deposition processes or techniques include physical vapor deposition (PVD), chemical vapor deposition (CVD), electrochemical deposition (ECD), molecular beam epitaxy (MBE) atomic layer deposition (ALD) and the like. Removal is a process that removes material from the wafer in bulk or selectively and includes etching processes. For example, chemical mechanical planarization (CMP) is a typical removal process used between levels of a device. Patterning processes are those that shape or later the shape of deposited materials. Patterning is also referred to as lithography. A typical patterning process includes using a photoresist material to selectively mask portions of the semiconductor device, exposing the device to a particular wavelength of light, and then washing away the unexposed regions with a developer solution. Electrical properties are altered by doping selected regions by diffusion and/or ion implantation. The processes are typically followed by an anneal process, such as a furnace anneal or rapid thermal anneal (RTA) in order to activate the implanted dopants.

Figure 2:
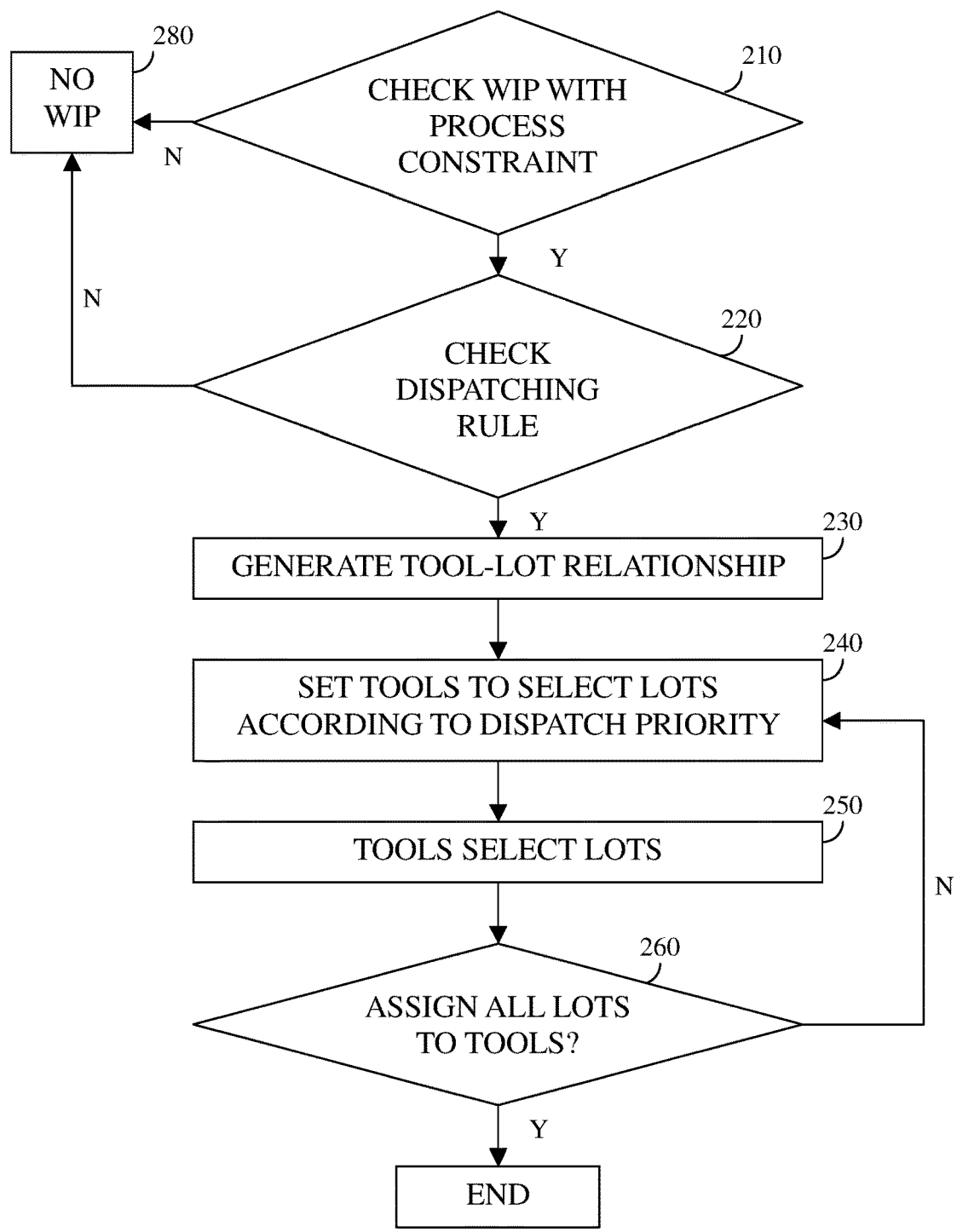
FIG. 2 is a flow chart of a method of assigning the lots to the tools, illustrated in FIG. 1, in accordance with some embodiments.

FIG. 2 is a flow chart of a method 200 of assigning the lots 121-123 to the tools 111-115, illustrated in FIG. 1, in accordance with some embodiments. The method 200 is applicable or readily adaptable to all technology nodes. In FIG. 2, the method 200 includes operation 210, operation 220, operation 230, operation 240, operation 250, operation 260, and operation 280. These operations are not recited in the sequence in which the operations are performed. That is, unless the sequence of the operations is expressly indicated, the sequence of the operations is interchangeable, and all or part of the operations may be simultaneously, partially simultaneously, or sequentially performed.

Aspects of the method 200 are implemented in software, hardware, firmware, or a combination thereof. For example, the various operations of the method 200 are implemented as a computer program product tangibly embodied in a machine-readable storage device for execution by a processing unit. Various operations of embodiments of the method 200 are performed by a computer processor executing a program tangibly embodied on a computer-readable medium to perform functions by operating on input and generating output. The computer-readable medium is, for example, a memory, a transportable medium such as a compact disk, a floppy disk, or a diskette, such that a computer program embodying the aspects of the method 200 are loaded onto a computer. The computer program is not limited to any particular embodiment, and for example, is implemented in an operating system, application program, foreground or background process, driver, or any combination thereof, executing on a single computer processor or multiple computer processors. Additionally, various operations of embodiments of the method 200 provide one or more data structures generated, produced, received, or otherwise implemented on a computer-readable medium, such as a memory.

In operation 210, it is determined that whether there is any WIP information with one or more process constraints in a process constraint database. The process constraint database is coupled with a manufacturing execution system. The manufacturing execution system provides lot information regarding wafers being processed in a fab, and the process constraint database is real-time refreshed by the manufacturing execution system.

In some embodiments, the tools 111-115 and measurement system are operatively coupled to a manufacturing execution system. The manufacturing execution system controls the processing operations in the tools 111-115, the measurement operations in measurement system, as well as additional tools and measurement systems that are configured to perform additional process operations either before, or after any of tools 111-115.

In some embodiments, when a wafer carrier, such as a front opening unified pod, containing wafers is to be transferred, the manufacturing execution system determines to what destination in the fab the wafer carrier should be transferred. This decision is based on production data. The manufacturing execution system provides the process constraints based on consideration for real-time conditions in the fab. For example, the process constraints define a tool-based process limitation based on at least one of a lot head, a lot tail, a part, a route, a recipe, a reticle, a reticle group, a stage, a customer code, a route operation, a start time, and an end time.

If the process constraint database has no WIP information, the operation proceeds to operation 280. If the process constraint database has the WIP information with process constraints, the operation proceeds to operation 220.

In operation 220, it is determined that whether there is a dispatching rule in the dispatching rule database. The dispatching rule database is coupled with a dispatching system.

In some embodiments, the dispatching system makes dispatch decisions and then feed back appropriate information to help improve future dispatch decisions. The dispatching system learns, with feedback, what is occurring in the tools and then changes the dispatch rule based upon that information.

If the process constraint database has no WIP information, the operation proceeds to operation 280. If the process constraint database has the WIP information with process constraints, the operation proceeds to operation 230.

In operation 230, a tool-lot relationship is generated based on at least one of the process constraints and the dispatching rule.

In some embodiments, the WIP information includes lot identification (ID) and tool ID, and the process constraints includes the tool ID, the lot head, the lot tail, the part, the route, the recipe, the reticle, the reticle group, the stage, the customer code, the route operation, the start time, and the end time. For instance, the tool ID of the tool 111 illustrated in FIG. 1 is Tool A, the tool ID of the tool 112 illustrated in FIG. 1 is Tool B, the tool ID of the tool 113 illustrated in FIG. 1 is Tool C, the tool ID of the tool 114 illustrated in FIG. 1 is Tool D, and the tool ID of the tool 115 illustrated in FIG. 1 is Tool E. A table 1 of the process constraints is shown below:

TABLE 1

| tool ID | part | recipe |
|---------|------|--------|
| Tool A  | PA   | RA     |
| Tool B  | PA   | RB     |
| Tool C  | PC   | RC     |
| Tool D  | PB   | RA     |
| Tool E  | PC   | RA     |

In this case, the lot identification of the lot 121 is N111111.00. If the lot information of the lot 121 is part: PC, and recipe: RC. The lot 121 meets the constraint rule of Tool C, so the lot 121 is not processed in the tool 113 (i.e., Tool C), but is processed in other tools 111, 112, 114 and 115 (i.e., Tool A, Tool B, Tool D, and Tool E). A table 2 of the tool-lot relationship based on above process constraints is shown below:

TABLE 2

| lot ID      | tool ID | Run Flag |
|-------------|---------|----------|
| N111111.00  | Tool A  | Y        |
| N111111.00  | Tool B  | Y        |
| N111111.00  | Tool C  | N        |
| N111111.00  | Tool D  | Y        |
| N111111.00  | Tool E  | Y        |

In the table 2, the tool-lot relationship between the lot 121 (i.e., N111111.00) and the tools 111-115 (i.e., Tool A, Tool B, Tool C, Tool D, and Tool E) is established. The lot N111111.00 is not processed in Tool C, and the corresponding run flag is 'N'. The lot N111111.00 is processed in any of Tool A, Tool B, Tool D, and Tool E, and the corresponding run flags are 'Y'.

In some embodiments, in operation 230, the tool-lot relationship is based on the dispatching rule. The dispatching system provides the dispatching rule, and the dispatching rule includes dispatching preferences. The dispatching preferences indicate that the tools fed back their preferences for one or more of the lots, in which these preferences depend on processing result, e.g., yield or the like. For instance, a table 3 of the tool-lot relationship based on the dispatching rule is shown below:

TABLE 3

| lot ID | Tech | tool ID | dispatching preference |
|---|---|---|---|
| N111111.00 | N20 | JETRT1 | Y |
| N111111.00 | N20 | JETRT2 | N |
| N111111.00 | N20 | JETRT4 | Y |
| N111111.00 | N20 | JETRT5 | N |
| N222222.00 | N16 | JETRT1 | Y |
| N222222.00 | N16 | JETRT2 | Y |
| N333333.00 | N10 | JETRT1 | N |
| N333333.00 | N10 | JETRT4 | Y |

In this case, the lot identification of the lot 121 illustrated in FIG. 1 is N111111.00 for the N20 technology node (20 nm process). The lot identification of the lot 122 illustrated in FIG. 1 is N222222.00 for the N16 technology node (16 nm process). The lot identification of the lot 123 illustrated in FIG. 1 is N333333.00 in the N10 technology node (10 nm process). The tool ID of the tool 111 illustrated in FIG. 1 is JETRT1, the tool ID of the tool 112 illustrated in FIG. 1 is JETRT2, the tool ID of the tool 114 illustrated in FIG. 1 is JETRT4, and the tool ID of the tool 115 illustrated in FIG. 1 is JETRT5.

For instance, based on the dispatching rule, the tool 111 (i.e., JETRT1) prefers to run N10/N16/N20, the tool 112 (i.e., JETRT2) prefers to run N16, the tool 114 (i.e., JETRT4) prefers to run N10/N20, the tool 115 (i.e., JETRT5) prefers to run N10/N16. Therefore, the lot 121 (i.e., N111111.00) prefers to run in JETR1/4, not in JETRT2/5; the lot 122 (i.e., N222222.00) prefers to run in JETRT1/2; the lot 123 (i.e., N333333.00) prefers to run in JETRT4.

In some embodiments, in operation 230, the tool-lot relationship is based on both of the process constraints and the dispatching rule. The manufacturing execution system provides the process constraints, where the process constraints at least include constraint rules of the tools. The manufacturing execution system also provides the lot information regarding wafers being processed in the fab. The dispatching system analyzes process information fed back from the tools and decides the dispatching rule. The dispatching system also provides dispatch priority. For instance, a table 4 of the tool-lot relationship based on both of the process constraints and the dispatching rule is shown below:

TABLE 4

| lot ID | tool ID | run flag | dispatching preference | dispatch priority |
|---|---|---|---|---|
| N111111.00 | JETRT1 | Y | Y | 1 |
| N111111.00 | JETRT2 | Y | N | 2 |
| N111111.00 | JETRT3 | N | N | 3 |
| NT11111.00 | JETRT4 | Y | Y | 4 |
| NT11111.00 | JETRT5 | Y | N | 5 |
| N222222.00 | JETRT1 | Y | Y | 1 |
| N222222.00 | JETRT2 | Y | Y | 2 |
| N333333.00 | JETRT1 | Y | N | 1 |
| N333333.00 | JETRT4 | Y | Y | 2 |
| N333333.00 | JETRT5 | N | N | 3 |

In this case, the lot identification of the lot 121 illustrated in FIG. 1 is N111111.00. The lot identification of the lot 122 illustrated in FIG. 1 is N222222.00. The lot identification of the lot 123 illustrated in FIG. 1 is N333333.00. The tool ID of the tool 111 illustrated in FIG. 1 is JETRT1, the tool ID of the tool 112 illustrated in FIG. 1 is JETRT2, the tool ID of the tool 113 illustrated in FIG. 1 is JETRT3, the tool ID of the tool 114 illustrated in FIG. 1 is JETRT4, and the tool ID of the tool 115 illustrated in FIG. 1 is JETRT5.

As to the process constraints in the table 4, the tool 113 (i.e., JETRT3) is incapable of processing the lot 121 (i.e., N111111.00), and the corresponding run flag is 'N'. The tool 115 (i.e., JETRT5) is incapable of processing the lot 123 (i.e., N333333.00), and the corresponding run flag is 'N'.

As to the dispatching preference in the table 4, the lot 121 (i.e., N111111.00) prefers to run in JETR1/4, not in JETRT2/5; the lot 122 (i.e., N222222.00) prefers to run in JETRT1/2; the lot 123 (i.e., N333333.00) prefers to run in JETRT4.

Since the process constraints and dispatching preference are considered, the tool-lot relationships are generated. The tool-lot relationship between the lot 121 (i.e., N111111.00) and any of the tools 111 and 114 (i.e., JETRT1/4) is established. The tool-lot relationship between the lot 122 (i.e., N222222.00) and any of the tools 111 and 112 (i.e., JETRT1/2) is established. The tool-lot relationship between the lot 123 (i.e., N333333.00) and the tool 114 (i.e., JETRT4) is established. It should be noted that if the process constraints and dispatching preference are not considered, lot 123 (i.e., N333333.00) will be assigned to JETRT1 and caused JETRT1 lost due to assignment failure.

Then, the tool-lot relationships are utilized to assign lots 121-123 to the tools 111, 112 and 114 respectively. In some embodiments, in operation 240, the tools 111, 112 and 114 are set to select the lots 121-123 in sequence according to the dispatch priority as shown in above table 4. Therefore, in operation 250, the tool 111 (i.e., JETRT1) selects the lot 121 (i.e., N111111.00), the tool 112 (i.e., JETRT2) selects the lot 122 (i.e., N222222.00), and the tool 114 (i.e., JETRT4) selects the lot 123 (i.e., N333333.00). With reference to FIG. 1, a lot-tool assignment is illustrated, where the lot 121 is assigned to the tool 111, the lot 122 is assigned to the tool 112, and the lot 123 is assigned to the tool 114.

In operation 260, it is determined that whether all lots are assigned to respective tools. If any of the lots is not assigned to the tool, the operation proceeds to operation 240, and the operation 240, operation 250 and operation 260 are repeated in an iterative manner. After all lots are assigned to the tools, as determined in operation 260, the lots are dispatched to the tools by a dispatcher of the dispatching system, or the like. For instance, the dispatcher takes the available lots in buffer and dispatches each lot to an assigned tool. The dispatching system learns, with feedback, what is occurring in the tool and then changes the dispatching rule.

Figure 3:
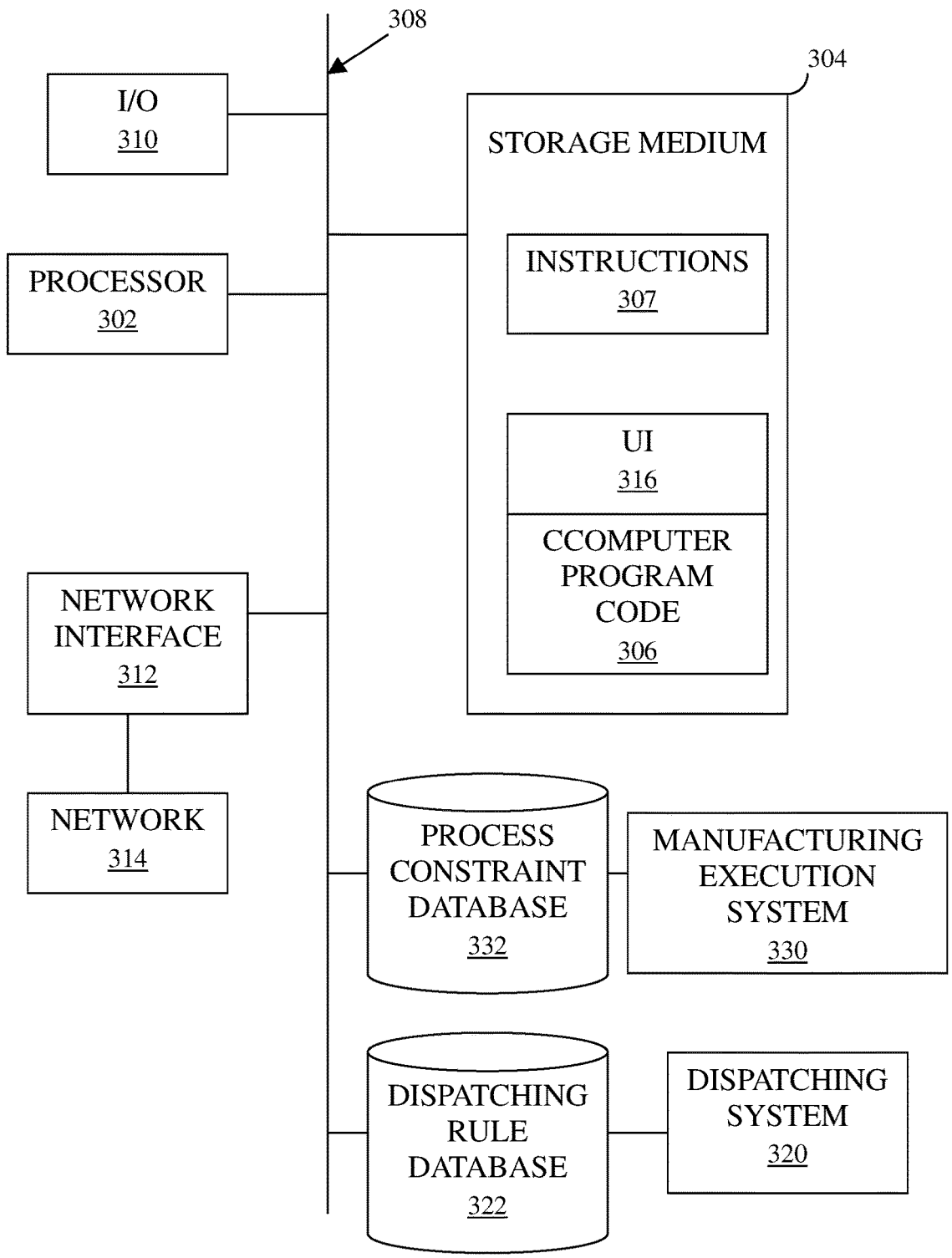
FIG. 3 is a block diagram of a system of assigning the lots to the tools, illustrated in FIG. 1, in accordance with some embodiments of the present disclosure.

FIG. 3 is a block diagram of a system 300 assigning the lots 121-123 to the tools 111-115, illustrated in FIG. 1, in accordance with some embodiments. In some embodiments, the system 300 is a computing device that implements the method 200 of FIG. 2 in accordance with one or more embodiments. The system 300 includes a process constraint database 332 and a dispatching rule database 322. The process constraint database 332 is coupled with a manufacturing execution system 330. The dispatching rule database 322 is coupled with a dispatching system 320.

The manufacturing execution system 330 provides the process constraints based on consideration for real-time conditions in the fab. The manufacturing execution system 330 writes the WIP information with one or more process constraints into the process constraint database 332, so that the process constraint database 332 is real-time refreshed by the manufacturing execution system 330. For example, the process constraints define a tool-based process limitation based on at least one of a lot head, a lot tail, a part, a route, a recipe, a reticle, a reticle group, a stage, a customer code, a route operation, a start time, and an end time.

The dispatching system 320 makes dispatch decisions and then feed back appropriate information to help improve future dispatch decisions. The dispatching system learns, with feedback, what is occurring in the tools and then changes the dispatch rule based upon that information. The dispatching system 320 parses and writes the dispatching rule into the dispatching rule database 322, so that the dispatching rule is real-time refreshed by the dispatching system 320.

The dispatching rule database 322 and process constraint database 332 are implemented in software, hardware, or a combination thereof. For example, any suitable non-transitory storage medium may be used for database and include non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The system 300 also includes a hardware processor 302 and a non-transitory computer readable storage medium 304 encoded with, i.e., storing, the computer program code 306, i.e., a set of executable instructions. Computer readable storage medium 304 is also encoded with instructions 807 for interfacing with manufacturing machines for producing the semiconductor device. The processor 302 is electrically coupled to the computer readable storage medium 304 via a bus 308. The processor 302 is also electrically coupled to an I/O interface 310 by the bus 308. A network interface 312 is also electrically connected to the processor 302 via the bus 308. The network interface 312 is connected to a network 314, so that the processor 302 and the computer readable storage medium 304 are capable of connecting to external elements via network 314. The processor 302 is configured to execute the computer program code 306 encoded in the computer readable storage medium 804 in order to cause system 300 to be usable for performing a portion or all of the operations as described e.g., in method 200.

In some embodiments, the processor 302 is a central processing unit (CPU), a multi-processor, a distributed processing system, an application specific integrated circuit (ASIC), and/or a suitable processing unit. Various circuits or units are within the contemplated scope of the present disclosure.

In some embodiments, the computer readable storage medium 304 is an electronic, magnetic, optical, electromagnetic, infrared, and/or a semiconductor system (or apparatus or device). For example, the computer readable storage medium 304 includes a semiconductor or solid-state memory, a magnetic tape, a removable computer diskette, a random access memory (RAM), a read-only memory (ROM), a rigid magnetic disk, and/or an optical disk. In one or more embodiments using optical disks, the computer readable storage medium 804 includes a compact disk-read only memory (CD-ROM), a compact disk-read/write (CD-R/W), and/or a digital video disc (DVD).

In some embodiments, the storage medium 804 stores the computer program code 806 configured to cause system 300 to perform method 200. In one or more embodiments, the storage medium 304 also stores information needed for performing the method 200 as well as information generated during performing the method 200 and/or a set of executable instructions to perform the operation of method 200. In some embodiments, UI 316 is a graphical user interface (GUI).

In some embodiments, the storage medium 304 stores instructions 307 for interfacing with external machines. The instructions 307 enable processor 302 to generate instructions readable by the external machines to effectively implement the method 200 during an analysis.

System 300 includes I/O interface 310. The I/O interface 310 is coupled to external circuitry. In some embodiments, the I/O interface 310 includes a keyboard, keypad, mouse, trackball, track-pad, touch screen, and/or cursor direction keys for communicating information and commands to processor 302.

In some embodiments, the I/O interface 310 includes a display, such as a cathode ray tube (CRT), liquid crystal display (LCD), a speaker, and so on. For example, the display shows information on ranking 324.

System 300 also includes a network interface 312 coupled to the processor 302. The network interface 812 allows system 300 to communicate with network 314, to which one or more other computer systems are connected. The network interface 812 includes wireless network interfaces such as BLUETOOTH, WIFI, WIMAX, GPRS, or WCDMA; or wired network interfaces such as ETHERNET, USB, or IEEE-1394. In one or more embodiments, the method 200 are implemented in two or more systems 300, and information, such as UI 316, are exchanged between different systems 300 via network 314.

One of ordinary skill in the art would recognize that an order of operations in the method 200 is adjustable. One of ordinary skill in the art would further recognize that additional steps are able to be included in the method 200 without departing from the scope of this description.

In some embodiments, a system is disclosed that includes a dispatching system and at least one processor. The dispatching system is configured to provide dispatching preferences indicating that tools feedback preferences thereof for at least one lot. The at least one processor is coupled to the dispatching system and at least one memory. Computer program code encoded in the at least one memory is executed by the at least one processor to cause the system to process the at least one lot using at least one of the tools with utilization of a tool-lot relationship that is generated based on the dispatching preferences.

In some embodiments, the dispatching preferences depend on at least one process result of the tools.

In some embodiments, the system further includes a dispatching rule database. The dispatching rule database coupled to the dispatching system and the at least one processor. The dispatching system is configured to write the dispatching preferences into the dispatching rule database, to refresh the dispatching preferences.

In some embodiments, the tool-lot relationship is generated further based on at least one process constraint, and the at least one process constraint is associated with a process limitation of the tools.

In some embodiments, the system further includes a manufacturing execution system. The manufacturing execution system coupled to the dispatching system and the at least one processor. The manufacturing execution system is configured to provide at least one process constraint for generating the tool-lot relationship.

In some embodiments, the dispatching system is further configured to change at least one dispatch rule based on the dispatching preferences that are fed back from the tools.

In some embodiments, the dispatching system is further configured to provide a dispatch priority that indicates a sequence of the at least one lot selected by the tools.

Also disclosed is a non-transitory computer readable medium. The non-transitory computer readable medium includes computer executable instructions executed by a processor for carrying out a method. The method includes the following operations: deciding a dispatching rule, based on process information fed back from at least one tool for processing at least one lot, wherein the dispatching rule includes at least one dispatching preference, and the at least one dispatching preference indicates preference of the at least one tool for processing the at least one lot; and generating a tool-lot relationship, based on at least one process constraint and the dispatching rule, for the at least one tool to manufacture semiconductor devices in the at least one lot.

In some embodiments, the method further includes the following operations: parsing the dispatching rule that is decided; and refreshing the dispatching rule, based on the process information that is fed back from the at least one tool.

In some embodiments, the method further includes the following operations: refreshing the at least one process constraint, based on lot information regarding at least one wafer being processed by the at least one tool.

In some embodiments, the method further includes the following operations: when the lot information meets the at least one process constraint, defining the at least one lot as being not manufacturing in the at least one tool.

In some embodiments, the method further includes the following operations: when the at least one process constraint is included in work-in-progress (WIP) information, analyzing the process information fed back from at least one tool.

In some embodiments, the method further includes the following operations: assigning the at least one lot to the at least one tool, based on a dispatch priority and the tool-lot relationship.

In some embodiments, the operation of assigning the at least one lot to the at least one tool further includes the following operations: setting the at least one tool to select the at least one lot in sequence, based on the dispatch priority.

Also disclosed is a method that includes the following operations: generating a tool-lot relationship, based on a dispatching rule, wherein the dispatching rule includes a dispatching preference, and the dispatching preference depends on a processing result from at least one tool for running at least one lot; assigning the at least one lot to the at least one tool by utilization of the tool-lot relationship to manufacture semiconductor devices on at least one wafer in the at least one lot; and refreshing the dispatching rule, based on the processing result feeding back from the assigned at least one tool.

In some embodiments, the method further includes the following operations: providing at least one process constraint, based on the at least one lot and the at least one tool. The tool-lot relationship is generated further based on the at least one process constraint.

In some embodiments, the method further includes the following operations: refreshing the at least one process constraint, based on the process result.

In some embodiments, the method further includes the following operations: checking work-in-progress (WIP) information with at least one process constraint is included in a process constraint database; and analyzing the processing result that is fed back from the at least one tool.

In some embodiments, the method further includes the following operations: processing the at least one lot by the at least one tool that is assigned with the utilization of the tool-lot relationship.

In some embodiments, the dispatching preference indicates preference of at least one tool for processing the at least one lot.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
   a dispatching system configured to provide dispatching preferences indicating that tools feed back preferences thereof for at least one lot;
   a dispatching rule database coupled to the dispatching system, wherein the dispatching system is configured to write the dispatching preferences into the dispatching rule database; and
   at least one processor coupled to the dispatching system and at least one memory, wherein computer program code encoded in the at least one memory is executed by the at least one processor to
   generate a tool-lot relationship, based on the dispatching preferences, for at least one of the tools, and
   cause the at least one of the tools to perform, based on the tool-lot relationship, semiconductor processes on the at least one lot for semiconductor fabrication, the semiconductor processes including: a deposition process, a planarization process, and a lithography process.

2. The system of claim 1, wherein the dispatching preferences depend on at least one process result of the tools.

3. The system of claim 1, wherein the dispatching rule database is coupled to the at least one processor,
   wherein the dispatching system is configured to refresh the dispatching preferences.

4. The system of claim 1, wherein the tool-lot relationship is generated further based on at least one process constraint, and the at least one process constraint is associated with a process limitation of the tools.

5. The system of claim 1, further comprises:
   a manufacturing execution system coupled to the dispatching system and the at least one processor,
   wherein the manufacturing execution system is configured to provide at least one process constraint for generating the tool-lot relationship.

6. The system of claim 1, wherein the dispatching system is further configured to change at least one dispatch rule based on the dispatching preferences that are fed back from the tools.

7. The system of claim 1, wherein the dispatching system is further configured to provide a dispatch priority that indicates a sequence of the at least one lot selected by the tools.

8. A non-transitory computer readable medium comprising computer executable instructions executed by a processor for carrying out a method, the method comprising:
- deciding a dispatching rule, based on process information fed back from at least one tool that processes at least one lot, wherein the dispatching rule includes at least one dispatching preference, and the at least one dispatching preference indicates that the at least one tool feeds back preferences thereof for processing the at least one lot; and
- generating a tool-lot relationship, based on at least one process constraint and the dispatching rule, for the at least one tool, and causing the at least one tool to perform, based on the tool-lot relationship, semiconductor processes on the at least one lot for semiconductor fabrication, the semiconductor processes including: a deposition process, a planarization process, and a lithography process.

9. The non-transitory computer readable medium of claim 8, wherein the method further comprises:
- parsing the dispatching rule that is decided; and
- refreshing the dispatching rule, based on the process information that is fed back from the at least one tool.

10. The non-transitory computer readable medium of claim 8, wherein the method further comprises:
- refreshing the at least one process constraint, based on lot information regarding at least one wafer being processed by the at least one tool.

11. The non-transitory computer readable medium of claim 10, wherein the method further comprises:
- when the lot information meets the at least one process constraint, defining the at least one lot as being not manufacturing in the at least one tool.

12. The non-transitory computer readable medium of claim 8, wherein the method further comprises:
- when the at least one process constraint is included in work-in-progress (WIP) information, analyzing the process information fed back from at least one tool.

13. The non-transitory computer readable medium of claim 8, wherein the method further comprises:
- assigning the at least one lot to the at least one tool, based on a dispatch priority and the tool-lot relationship.

14. The non-transitory computer readable medium of claim 13, wherein assigning the at least one lot to the at least one tool further comprises:
- setting the at least one tool to select the at least one lot in sequence, based on the dispatch priority.

15. A method, comprising:
- generating a tool-lot relationship, based on a dispatching rule, wherein the dispatching rule includes a dispatching preference, the dispatching preference depends on a processing result from at least one tool for running at least one lot, and the dispatching preference indicates that the at least one tool feeds back preferences thereof for the at least one lot;
- assigning the at least one lot to the at least one tool by utilization of the tool-lot relationship to manufacture semiconductor devices on at least one wafer in the at least one lot;
- causing the at least one tool to perform, based on the tool-lot relationship, semiconductor processes on the at least one lot for semiconductor fabrication, the semiconductor processes including: a deposition process, a planarization process, and a lithography process; and
- refreshing the dispatching rule, based on the processing result feeding back from the assigned at least one tool for running the at least one lot.

16. The method of claim 15, further comprising:
- providing at least one process constraint, based on the at least one lot and the at least one tool,
- wherein the tool-lot relationship is generated further based on the at least one process constraint.

17. The method of claim 16, further comprising:
- refreshing the at least one process constraint, based on the process result.

18. The method of claim 15, further comprising:
- checking work-in-progress (WIP) information with at least one process constraint is included in a process constraint database; and
- analyzing the processing result that is fed back from the at least one tool.

19. The method of claim 15, wherein the dispatching preference indicates preference of at least one tool for processing the at least one lot.

20. The method of claim 15, further comprising:
- providing at least one process constraint, based on the at least one lot and the at least one tool,
- wherein the tool-lot relationship is generated further based on the at least one process constraint; and
- refreshing the at least one process constraint, based on the process result.

* * * * *